May 12, 1931.                    B. DRKAL                    1,805,081
                             CLUTCH FOR MOTOR CARS
                        Filed Feb. 2, 1929      2 Sheets-Sheet 1
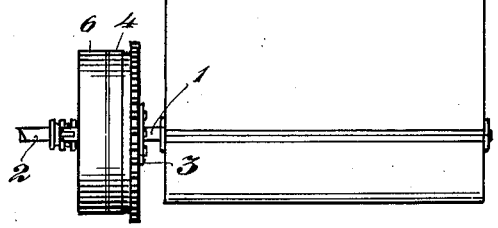
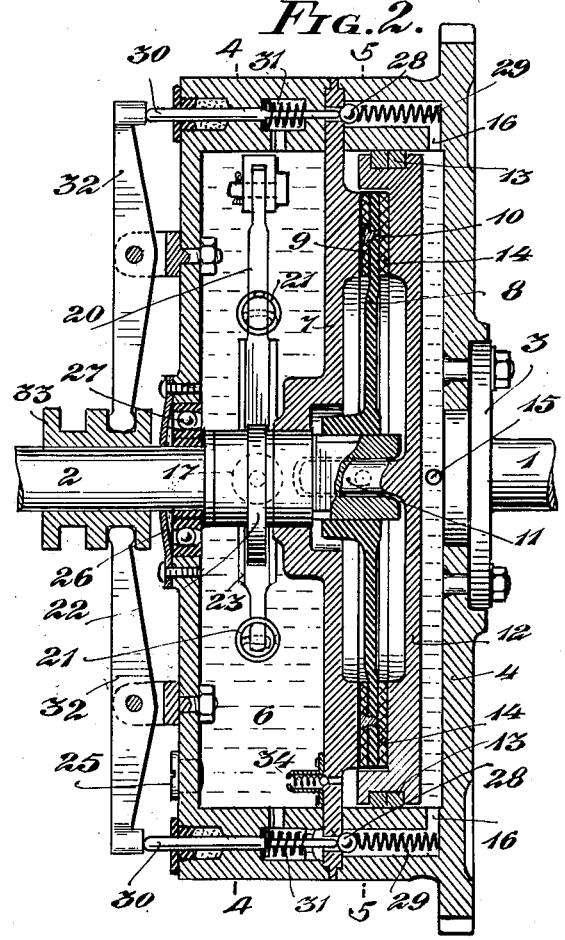
Bohumil Drkal
INVENTOR
BY
his ATTORNEY.

May 12, 1931. B. DRKAL 1,805,081
CLUTCH FOR MOTOR CARS
Filed Feb. 2, 1929  2 Sheets-Sheet 2.

Bohumil Drkal
INVENTOR
BY
his ATTORNEY

Patented May 12, 1931

1,805,081

UNITED STATES PATENT OFFICE

BOHUMIL DRKAL, OF BUENOS AIRES, ARGENTINA

CLUTCH FOR MOTOR CARS

Application filed February 2, 1929. Serial No. 337,074.

The present invention relates to improvements in the construction of clutch mechanisms particularly adapted for automobiles and is designed to employ an improved principle of operation wherein the clutching engagement of the parts is effected by compression of oil or other liquid and in response to the relative movement between the driving or motor shaft and the driven shaft.

My improved clutch construction allows of obtaining many important advantages including positive and effective engagement of the clutching parts under automatically controlled and gradually applied pressures so as to eliminate abrupt coupling action and the objectional quick starting with undue strains resulting therefrom. It is moreover operable for the release of the clutch under relatively light foot pressure in that the structure does not employ the usual comparatively heavy acting clutch spring as at present customarily employed.

Important features of the present invention include a pressure chamber member coupled to the driving shaft of the motor containing a shiftable piston clutch element positioned to effect engagement with a clutch disc rotatively secured to the driven shaft and having incorporated therewith a suitable pumping device connected with the pressure chamber and arranged to be operated by the movement of the driving shaft relative to the driven shaft for normally applying fluid pressure to the piston clutch element to effect the coupling.

The foregoing and other features and advantages of my improved clutch construction will be more fully understood by reference to the accompanying drawings wherein like reference characters are applied to the corresponding parts in the several views.

In the drawings:

Fig. 1 is a view in side elevation showing my improved clutch device associated with a motor of the usual internal combustion type.

Fig. 2 is a central, vertical sectional view of the improved clutch construction.

Figure 3:
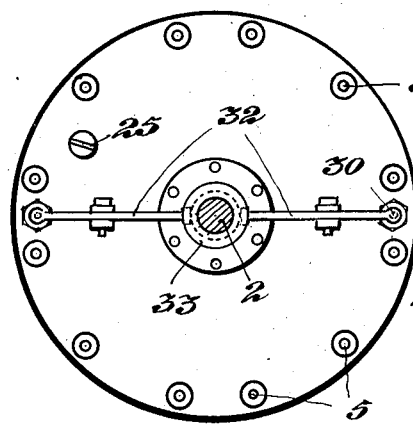
Fig. 3 is a view in end elevation of the reservoir casing portion having the clutch release levers mounted thereon.
Figure 4:
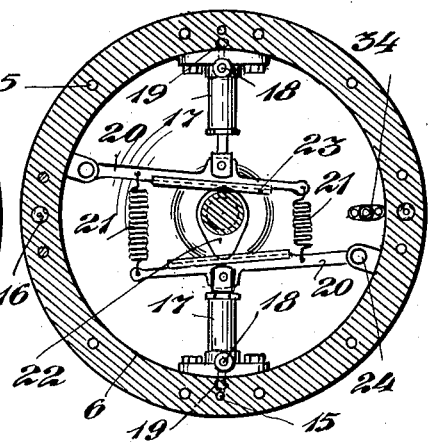
Fig. 4 is a vertical sectional view taken on line 4—4 of Fig. 2.
Figure 5:
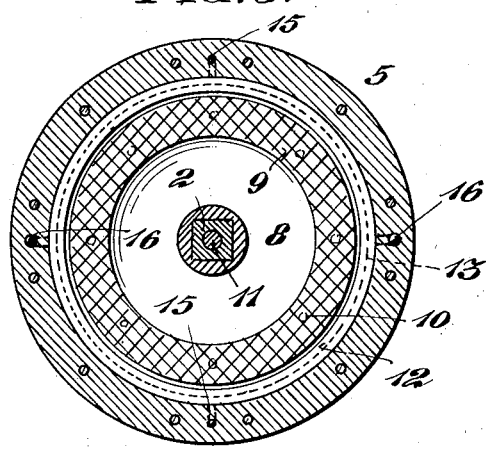
Fig. 5 is a vertical sectional view taken on line 5—5 of Fig. 2.
Figures 6, 7:
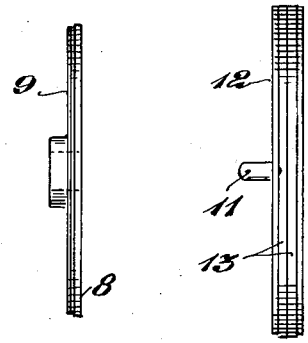
Fig. 6 is a view in side elevation showing the clutch plate.
Fig. 7 is a view in side elevation showing the piston clutch element or plate.

In the drawings 1 indicates the driving shaft of the motor and 2 the driven shaft for connection to a transmission mechanism. To the driving shaft, by means of the integral flange 3, there is affixed the compression chamber casing member 4 having secured thereto by screws 5 the oil chamber casing member 6 with the interposed separating wall or partition 7 clamped therebetween. The driven shaft 2 is extended forwardly, with a bearing in the partition 7, into the enclosure of the casing member 4 and is formed at its end with a squared shoulder portion fitted within a complemental opening in the clutch plate or disc member 8 which carries a ring 9 of fibre or other suitable material secured by rivets 10. The end portion of the driven shaft 2, as shown, is centrally bored to provide a bearing opening to receive the bearing pin portion 11 of the clutch piston member or element 12 which carries at its periphery the adjusting or expansible sealing rings 13 engaging the annular horizontal wall of the casing member 4 thereby to form with said casing a compression chamber. Upon its face toward the clutch plate 8, the piston plate 12 is provided with the ring 14 of fibre for clutching engagement with the plate 8 when pressed thereagainst. The piston element 12 by means of its central bearing pin mounting as shown is capable of movement in the direction axially of the shafts and the central bearing of the clutch plate is likewise arranged to allow of axial movement of the plate 8 whereby upon the generation of fluid pressure within the compression chamber the clutch plate 8 will be compressed between the fibre washers or rings 9 and 14 and coupling effected.

In accordance with the present invention the fluid pressure is applied to the piston clutch element in an improved manner whereby the fluid, preferably oil, is automatically pumped or forced within the compression chamber from the reservoir or supply chamber 6 so as to effect a gradual or progressive increase in the operating pressure. For this purpose openings or passages 15 are formed in the casing members 4 and 6 and through the partition 7 for the admission of oil within the compression chamber behind the piston element and communicating with the supply chamber. Similarly, ducts or passages 16, communicating with the supply and compression chambers, are provided for the escape of the oil from the latter chamber. The ducts 15, as shown, communicate at their supply chamber terminals 18 with the chambers of compression pumps 17 having the intake openings 19 from the supply chamber. The pumps 17 are provided with pistons connected with arms 20 moved in one direction by the contractive springs 21 and moved in the opposite or impulse direction by the engagement with the arms of an eccentric 22 fixed on the driven shaft 2; the arms being provided with bearing plates 23 engaged by the eccentric. The oil is introduced within the chamber 6 through the opening 25 and the closure between the chamber member 6 and the driven shaft 2 is effected by means of a washer or cap 26 covering the ball bearings 27 of the chamber casing member 6.

The oil escape passages 16 are formed with suitable seats for the spherical valves 28 normally to close the passages under the action of the springs 29 positioned behind the valves 28 as shown. Fitted to suitable bearings in the casing member 6, there are provided valve opener rods 30 in alignment with the spherical valves 28, said rods being normally retracted by the springs 31 fitted within the enlargements of the passages 16 as shown. The outer end portions of the rods project from the casing to be engaged by clutch release levers 32, centrally fulcrumed on the casing 6 and having their inner ends engaging within the annular groove of an actuator 33 slidably mounted upon the driven shaft 2 and moved under the control of the clutch pedal as will be readily understood.

A pressure yielding valve 34 is positioned to close a relief opening or duct in the partition 7 for the purpose of allowing the escape of oil therethrough when the desired maximum working pressure within the compression chamber has been reached.

The operation of the improved clutch mechanism is as follows. With the motor started, the whole of the clutch mechanism rotates with the driving axle with the exception of the driven shaft 2, the eccentric 22 and the clutch plate 8 mounted thereon. The actuator sleeve 33 is held normally by the clutch operating pedal in the position in which the valves 28 are open. As a result of the driven shaft 2 remaining stationary, the engagement of the eccentric 22 with the arms 20 actuates the pumps 17 to propel oil into the compression chamber through the passages 15, but as the valves 28 are in open position, the oil circulates from the chamber 4 to the chamber 6 without any effect upon the piston 12.

When it is desired to make the clutch effective, for starting of the vehicle, the clutch operating pedal which moves the actuator sleeve 33 is pressed down, allowing the shutting of the valves 28. It accordingly follows that the oil propelled by the pumps 17 accumulates in the chamber 4, and as it cannot escape it imparts an operating pressure upon the piston clutch element under progressively increasing compression to effect a gradual coupling engagement by compression of the clutch plate 8 between the fibre rings 9 and 14. The clutch plate 8 being so engaged under pressure is obliged to turn with the clutch casing members 4 and 6 and the rotation of the driving shaft 1 is transmitted to the driven shaft 2, as the clutch plate is rotatively secured to the latter. In the coupling action as aforesaid, the resistance to rotation offered by the driven shaft 2 and the resulting rotation of the drive shaft with relation thereto effects the operation of the pumps which will accordingly build up pressure in the compression chamber until coupling is fully effected and the shafts rotate in unison. As will be further appreciated the operating pressure behind the piston will automatically be built up proportionate to the resistance offered by the driven axle and required for the movement of the vehicle.

Having described my invention, I claim:

1. A device of the character described having in combination with a driving shaft and a driven shaft, a clutch casing member rotatably secured to the driving shaft and formed with a fluid supply chamber and a compression chamber therein and with inlet and outlet passages from the compression chamber to the supply chamber, a clutch plate rotatively secured to the driven shaft and positioned within the compression chamber, a piston clutch element operable within the compression chamber to effect coupling engagement with the clutch plate, pumping means within the supply chamber supported to be rotatable with the casing and connected to the inlet passages, actuating means for the pumping means carried by the driven member whereby the fluid will be pumped into the compression chamber in response to relative movement between the driving and driven shafts and valve means for opening and closing the outlet passages under the control of the operator.

2. A device of the character described having in combination with a driving shaft and a driven shaft, a clutch casing member rotatively secured to the driving shaft and formed with a fluid supply chamber and a compression chamber therein and with inlet and outlet passages from the compression chamber to the supply chamber, a clutch plate rotatively secured to the driven shaft, a piston clutch element operable within the compression chamber for coupling engagement with the clutch plate, pumping means within the supply chamber supported to be rotatable with the casing and connected to the inlet passages, operating levers for the pumping means pivotally supported on the casing, an eccentric on the driven shaft positioned to engage the operating levers for operating the latter in response to relative movement between the driving and the driven shafts, valves within the outlet passages operative normally to close said passages, valve opener rods slidably fitted to the casing in alignment with the valves for opening the latter, clutch release levers fulcrumed on the casing to engage the rods, an actuator sleeve slidably fitted on the driven shaft and engaging the levers, a relief passage between the chambers having a pressure yielding valve associated therewith for returning the fluid to the supply chamber from behind the piston element, substantially as described.

3. A clutch mechanism of the character described having in combination with a driving shaft and a driven shaft, a clutch casing member consisting of supply and compression casing members united with a partition member therebetween forming fluid supply and compression chambers and formed with inlet and outlet passages from the compression chamber to the supply chamber, a clutch ring mounted on the partition member, a clutch plate fitted to a squared end of the driven shaft within the compression chamber member for engagement with the clutch ring, a piston clutch element operable within the compression chamber member and provided with a clutch ring positioned for clamping the clutch plate between it and the partition ring, piston rings on the periphery of the piston element engaging the inwardly directed wall of the chamber member, pumping means within the supply chamber supported to be rotatable with the casing and connected to the inlet passages, operating levers for the pumping means pivotally supported on the casing, an eccentric on the driven shaft positioned to engage the operating levers for operating the latter in response to relative movement between the driving and the driven shafts, ball valves within the outlet passages operative normally to close said passages, valve opener rods slidably fitted within the casing in alignment with the ball valves for opening the latter when moved in one direction, springs engaging said rods for moving same in the other direction, release levers fulcrumed on the casing to engage the rods, an actuator sleeve slidable on the driven shaft and engaging the levers, a relief passage in the partition and a yielding valve closing said passage and yieldable to pressure from the compression chamber side.

BOHUMIL DRKAL.